Feb. 17, 1953  B. A. WEIDEMAN  2,628,992
METHOD AND APPARATUS FOR POSITIONING
BATTERY FOR LEAD-BURNING

Filed July 20, 1949  3 Sheets-Sheet 1

INVENTOR.
Bernard A. Weideman
BY John W. Michael
ATTORNEY

Feb. 17, 1953
B. A. WEIDEMAN
2,628,992
METHOD AND APPARATUS FOR POSITIONING
BATTERY FOR LEAD-BURNING
Filed July 20, 1949
3 Sheets-Sheet 2
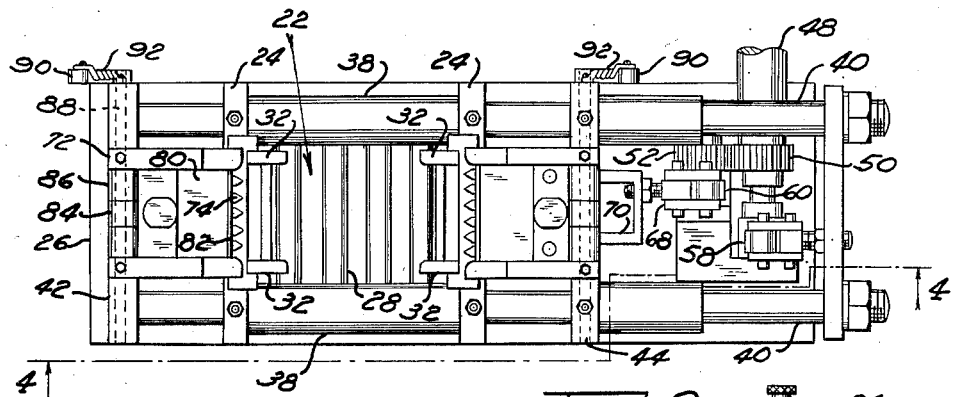
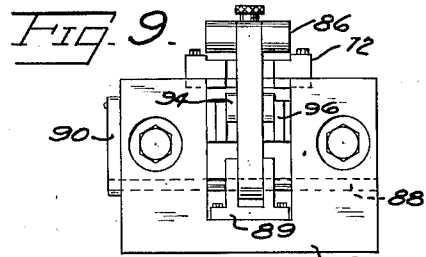
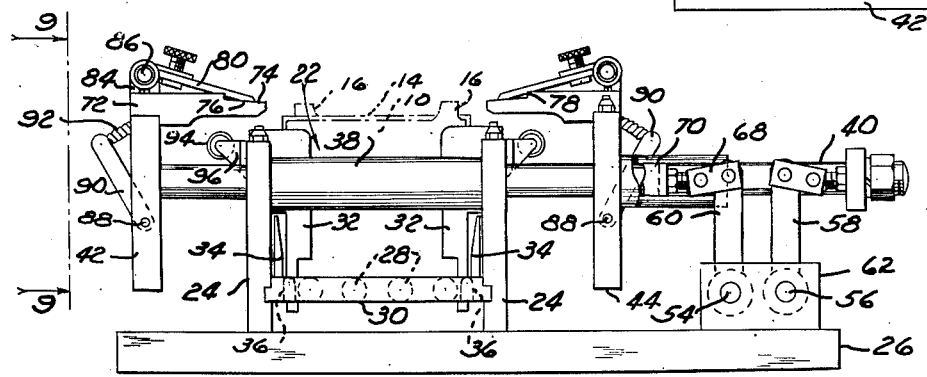
INVENTOR.
Bernard A. Weideman
BY
John W. Michael
ATTORNEY Feb. 17, 1953 B. A. WEIDEMAN 2,628,992
METHOD AND APPARATUS FOR POSITIONING
BATTERY FOR LEAD-BURNING
Filed July 20, 1949 3 Sheets-Sheet 3
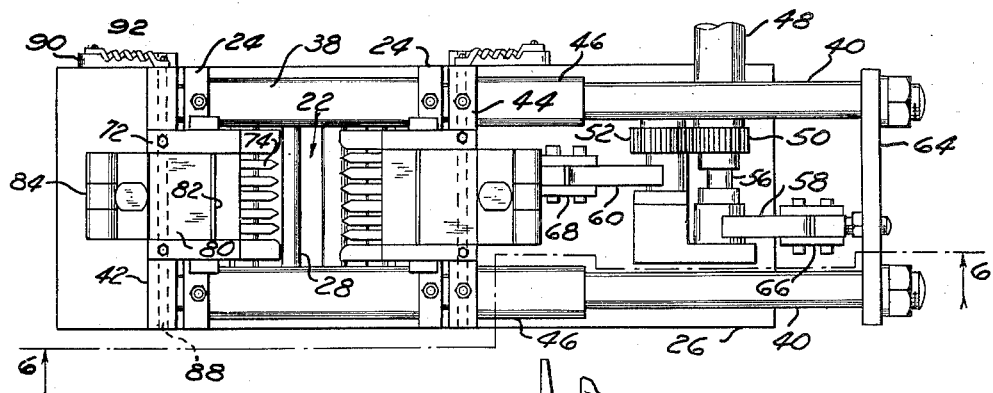
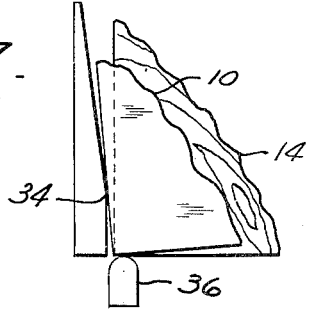
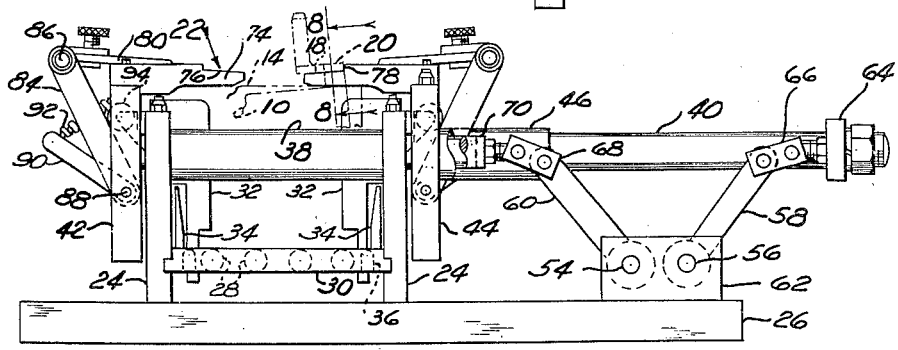
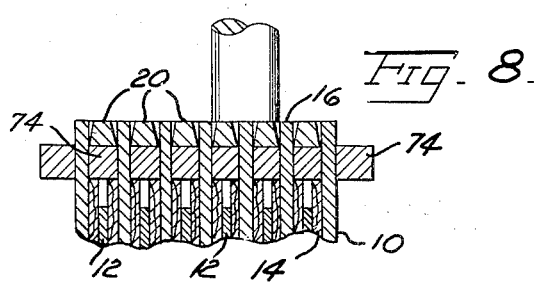
INVENTOR.
Bernard A. Weideman
BY
John W. Michael
ATTORNEY Patented Feb. 17, 1953

2,628,992

UNITED STATES PATENT OFFICE 2,628,992

METHOD AND APPARATUS FOR POSITIONING BATTERY PLATES FOR LEAD-BURNING

Bernard A. Weideman, Sussex, Wis., assignor to Globe-Union Inc., Milwaukee, Wis., a corporation of Delaware Application July 20, 1949, Serial No. 105,734

6 Claims. (Cl. 136—176)

This invention relates to storage batteries and particularly to apparatus and method for positioning pre-arranged plates and separators and inserting burning-irons preparatory to adding connecting straps and lead-burning the plates and connecting straps.

It is more efficient to lead-burn the plates and connecting straps after the plates and separators have been arranged in proper order but the problem is to properly position the burning-irons or mold blocks between the lugs of the plates without interference from and damage to the separators. One approach to this problem consisted of placing a slotted insulating strip over the lugs of the plates. This strip formed a lower mold block protecting the separators from the heat of the lead-burning operation. However, this caused the connecting straps to be unduly spaced above the tops of the separators, unnecessarily increasing the height of the cell. Another approach consisted of first placing the plates and separators in a clip with a corrugated bottom and pushing the separators down into the corrugations before the burning-irons were inserted between plate lugs. Under production conditions this is impractical. The separators, which of necessity have a wide tolerance of thickness, will often not locate over a respective slot and as a consequence the operation results in considerable damage to the separators. Furthermore, there is an extra handling operation in removing the clips. Other approaches included the use of plates with extra high lugs leaving room for the teeth on the burning-irons to be inserted between the separators over the tops of the plates. A second plate with wide teeth intermeshed with the lugs over the tops of the separators. This also resulted in making the cell unnecessarily high, a great disadvantage in the highly competitive automobile battery field where space limitations are controlling and, unless a special type of connecting strap was used, the separators could float up in the electrolyte unnecessarily exposing the lower part of the plates. Besides a high per cent of scrap occurs when teeth are pushed in between the separators.

It is an object of this invention, therefore, to provide an apparatus which will position prearranged plates and separators for lead-burning and place burning-irons in the proper location with respect to such plates without damage to the separators, the lead-burning position being such that after lead-burning the connecting straps to the plates, the plates and separators may be rearranged in normal position with the connecting straps close to the tops of the separators.

Another object of this invention is to provide a method of relatively positioning plates and separators after preassembly thereof into a group for insertion into a battery cell so that burning-irons may be placed between the plates without damage to the separators, and the plates and separators relatively repositioned, after lead-burning connecting straps thereon, in normal relationship for insertion within the battery cell with the connecting straps closely adjacent the top of the separators.

These objects are obtained by providing a jig or receptacle for holding plates and separators normally unconnectedly assembled in a cell group with the plate lugs of opposite polarity projecting above the upper edges of the separators in rows spaced inwardly from the side edges thereof. The receptacle contains a set of fulcrums which will engage the side and bottom edges of the plates adjacent the lower corners thereof and permit the plates to be tilted thereabout. A pair of burning-irons provided with a series of teeth adapted to fit and substantially fill the gap between plates of like polarity are carried by the receptacle and are movable inwardly from opposite sides thereof over the tops of the separators to hold the latter from tilting. Pusher bars or members are resiliently carried on the burning-irons and the leading edges thereof engage the plate lugs as the burning-irons advance and tilt the plates until the plate lugs are raised above the normal position an amount substantially equal to the thickness of said burning-iron teeth. Thereafter, as the burning-irons move into lug spacing and holding position, a lever and roller stop arrangement acting between the receptacle and the pusher bars effects the withdrawal of such bars exposing the tops of said burning-iron teeth. A connecting strap with a desired type of post and fingers adapted to be fitted between the plate lugs and substantially fill the gap therebetween may then be placed on and supported by the top surface of said teeth. As the top surface of such teeth is inclined to the horizontal and is substantially parallel to the top edge of the plates as tilted, the connecting strap will also be so inclined. Hence, when a lead-burning torch melts the metal of the fingers and lugs, the top of the moulten metal will become level and horizontal. Thus the juncture between the connecting strap and lugs will have a tapered section which lessens the amount of waste lead.

By tilting the plates above normal position with respect to the separators the thickness of the teeth on the burning-irons may be great enough to adequately conduct heat away during the lead-burning and prevent injury to the separators and yet, after lead-burning, the plates may be moved to normal relationship and the height of the connecting straps above the tops of the separators will be at a minimum and such straps will be on or close to the tops of the separators. During lead-burning: the top surface of the burning-iron teeth are under both the fingers and body of the connecting strap and act as a chilling surface and bottom of a mould block; the body of the connecting strap acts as the inner wall of such mould block; and a shoulder on the burning-iron adjacent the base of the teeth thereof acts as the outer end of such mould block. The mould block thus formed prevents the metal of the lug and connecting strap fingers from dropping between the plates and the teeth to the separators and allows the use of such intense heat that impurities in the metal of the plate lugs and connecting strap fingers are boiled out and a solid joint and weld established therebetween.

The novel features, which are considered characteristic of the invention, are set forth with particularity in the appended claims. The invention itself, however, both as to its organization and its method of operation, together with additional objects and advantages thereof, will best be understood from the following description of specific embodiments when read in connection with the accompanying drawings, in which:

Fig. 3 is a plan view of apparatus for holding the battery cell group and tilting the plates thereof preparatory to lead-burning connecting straps, the apparatus being shown in cell group receiving position;

Fig. 4 is a view partly in side elevation and partly in section taken from line 4—4 of Fig. 3;

Fig. 5 is a plan view of the apparatus of Fig. 3 in the plate-tilted position thereof;

Fig. 6 is a view partly in side elevation and partly in section taken from line 6—6 of Fig. 5;

Fig. 7 is an enlarged fragmentary view in side elevation illustrating the plates as tilted about the fulcrums;

Fig. 8 is an enlarged fragmentary sectional view taken on line 8—8 of Fig. 6; and Fig. 9 is a view in end elevation taken from line 9—9 of Fig. 4.

Figure 1:
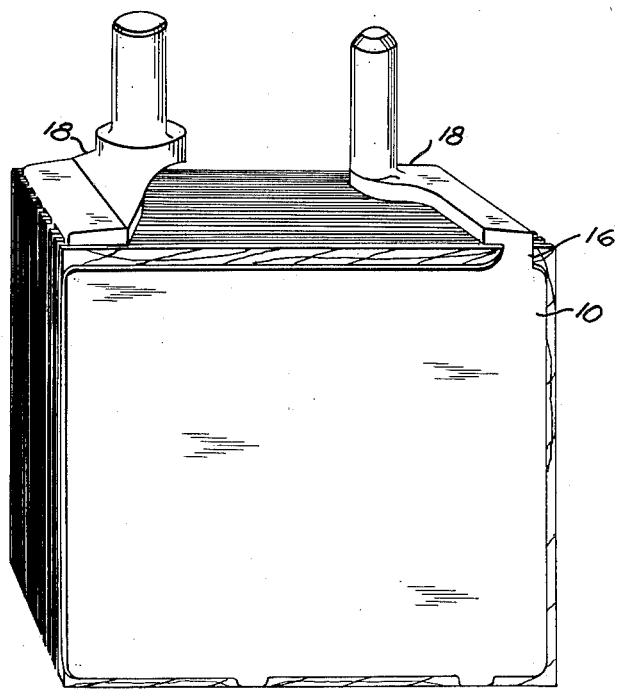
Fig. 1 is a perspective view of a battery cell group assembled and connected in the normal relationship for insertion into a battery container.
Figure 2:
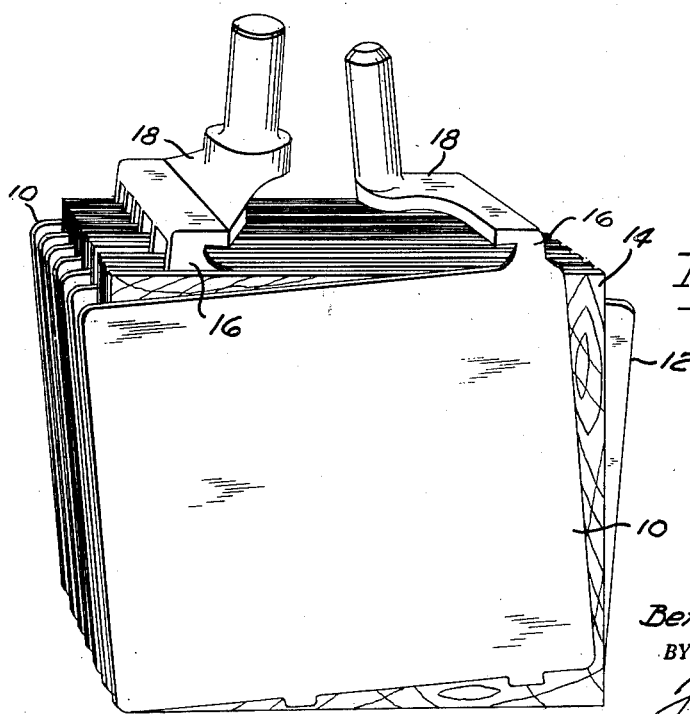
Fig. 2 is a perspective view of such cell group with the plates thereof tilted with respect to the separators in the position in which the connecting straps are lead-burned to the plate lugs.

Referring to the drawings by reference numerals, the cell group consists of negative plates or electrodes 10 which are spaced from positive plates or electrodes 12 by separators 14. The plates and separators are of common well-known construction and the plates have lugs 16 projecting above the top edges of the separators. The separators are of larger area than the plates and in the normal position of the cell group the edges of the separators extend beyond the edges of the plates to insure against undesirable short-circuiting between the plates. As shown in Figs. 1 and 2, the plates of like polarity are assembled with their lugs arranged in a row. The rows are spaced inwardly from opposite sides of the separators. The lugs in each row are connected by lead-burning them to connecting straps. Certain of these straps have negative terminal posts, others have positive terminal posts, while still others have negative or positive connector posts. As the type of post is not material to this invention, only one type is illustrated. The connecting straps each have a transverse body portion 18 which provides a support for a plurality of fingers 20 extending laterally therefrom. These fingers are adapted to fit and substantially fill the gap between adjacent lugs of like polarity. In Fig. 8 such fingers are shown positioned between the lugs 16 of the negative plates 10 prior to the lead-burning of the metal in such fingers and lugs.

The cell group is held, while the plates are tilted relative to the separators and the burning irons inserted, in a jig or receptacle designated generally as 22 which receives the cell group in the normal position illustrated in Fig. 1 (but with the plates unconnected). This receptacle is positioned between supports 24 mounted in a suitable fashion on a base 26. The bottom of the receptacle consists of a plurality of spaced rollers or rods 28 carried in members 30 extending between supports 24. These rollers or rods engage the bottoms of the separators and plates (or the bottom lugs on the plates if so provided) to support the separators and permit the plates to have sliding motion. The sides of the receptacle for holding the cell group assembled consists of guides 32 also secured to the supports 24. The side edges of the separators and plates are moved into and held into position by end guides positioned in opposite ends of the receptacle. The end guides have a sloping upper surface which joins with a vertical surface along line 34. Such line acts as a fulcrum about which the plates may be tilted. The action of fulcrum line 34 is illustrated in Fig. 7. Some types of plates have lower lugs which will rest upon rollers or rods 28 when the cell group is in the receptacle. It is therefore advisable to supply rests or lower fulcrums 36 which are spaced slightly inwardly from fulcrum lines 34. The plates will then tilt about meandering axes under the control of both fulcrums. In practice, cell groups, like those of Figs. 1 and 2, may vary in number and size of plates and separators. Accordingly the receptacle 22 may be constructed so that: the bottom may be raised or lowered as desired; the side guides 32 may be interchanged for guides of different widths; and the fulcrums 34 and 36 adjusted or interchanged for plates of different heights. When a cell group is inserted in the receptacle 22 the side guides 32 hold the plates and separators close together but not so tight that the plates may not be moved relative to the separators and yet with sufficient friction therebetween to hold the plates in the tilted lead-burning position relative to the separators.

The means for tilting the plates and inserting burning-irons is mounted in tubular bearings 38 carried by supports 24. A pair of rods 40 are slidable in such bearings and extend from the ends thereof. There is fixed to one end of these rods a burning-iron support 42 which moves toward and away from receptacle 22 as rods 40 are shifted longitudinally. Another burning-iron support 44 is provided with tubular bearings 46 by which such support is slidably mounted on the rods 40 and may be moved toward and away from receptacle 22. To accomplish simultaneous, synchronized, oppositely related motion of supports 42 and 44, the reciprocal rotation of a shaft 48 is transmitted by gear 50 through gear 52 to shaft 54. The shaft 48 has a reduced extension 56 on which is mounted a lever 58 which oscillates as such shaft reciprocates. The shaft 54 has mounted thereon a lever 60 which will also oscillate in a direction opposite from lever 58 as the shaft 54 reciprocates. Both shafts 54 and 56 are supported in bearing block 62. The upper end of lever 58 is connected to rods 40 through a crosshead 64 and links 66, and the upper end of lever 60 is connected directly to the support 44 by linkage 68 and bridge 70 (see Fig. 3). Thus reciprocal rotation of shaft 48 causes the burning-iron supports 42 and 44 to be shifted from the cell group receiving position of Figs. 3 and 4 to the plate-tilted position of Figs. 5 and 6, and vice versa. The rotation of main shaft 48 is controlled by any number of means (none shown) such as solenoids, pneumatic or hydraulic piston-cylinders, or other reciprocally movable sources of power which may be readily operator-controlled.

The burning-irons 72 which are carried by supports 42 and 44 are of substantially identical construction with the exception of the number of teeth and the relationship of the outer teeth to the side guides 32 in the recepacle 22. Each burning-iron has pointed teeth 74 which are wide enough to fit and substantially fill the space between lugs 16 of like polarity. These teeth thus accurately determine the desired correct pitch between lugs of like polarity. The upper surface of the teeth 74 slopes downwardly toward the pointed ends to form a chilling surface 76 and support for the connecting straps. The slope is approximately 5° and is enough to keep the chilling surface substantially parallel with the top edges of the plates as tilted. A shoulder 78 extends transversely of the burning-iron 72 along the base of the teeth and cooperates with the surface 76 to form the outer walls of the mould block. The teeth 74 are long enough so that when the shoulder 78 rests against lugs 16 to hold the lugs at the correct burning height, the teeth will project inwardly of the lugs to provide support for the body 18 of the connecting strap. In the embodiment described, the left-hand burning-iron has five fully pointed teeth and two half-pointed end teeth. As this burning-iron engages with the lugs of positive polarity, the end teeth are spaced slightly inwardly of the side guides 32 in order that such teeth will cover the tops of the two outer separators 14. The right-hand burning-iron which engages with the lugs of negative polarity has six full-pointed teeth and two half-pointed end teeth. The end teeth of this burning-iron are in alinement with the side guides 32 because such teeth bear against the outside of the lugs on the two outside negative plates 12. The teeth 74 of the burning-irons are made substantially thick so that they will easily conduct heat and prevent damage to the separators 14. The burning-irons 72 are so mounted on supports 42 and 44 that the bottoms of teeth 74 barely clear the tops of separators 14 as such burning-irons are moved inwardly of the receptacle. Thus, as the burning-irons are moved inwardly over the cell group in the receptacle, the teeth will act as abutments preventing the separators from tilting as the plates are tilted relative thereto. The burning-irons 72 may be interchangeable so that the apparatus is adapted to be used with different cell groups.

The plates are tilted as the burning-irons 72 are moved inwardly by pusher bars or plates 80, the forward lower edges 82 of which are slidable on and liftable from seats on the tops of the burning-irons (the burning-irons move only in a plane). The seats are recessed so that the lower front edges 82 in the lug-engaging position are substantially in alinement with the chilling surfaces 76. As the edges 82 push the lugs 16 inwardly, to tilt the plates 10 and 12, such lugs will be raised as said plates are tilted. Hence, it is preferable to permit edges 82 to also raise and thus prevent frictional relative sliding between the lugs and pusher plates (which would be the case if shoulders 78 of the burning-irons did the pushing). Therefore, the bars are permitted to pivot about pins 86 to allow the edges 82 to rise up with the lugs. The pusher bars are constantly resiliently urged forwardly relative to the burning-irons by levers 84 mounted in slots on supports 42 and 44 by shafts 88 (see Fig. 9) and connected to such pusher bars by pins 86. The levers are centered in the slots by brackets 89 through which shafts 88 pass. The shafts 88 also have fixedly mounted on the outer ends thereof, adjacent the edges of supports 42 and 44, auxiliary levers 90 which are angularly related to levers 84 to permit springs 92 to extend under tension between the edges of supports 42 and 44 and the tops of levers 90. The springs 92 thus continually resiliently urge the levers 84 into the substantially vertical position shown in Figs. 3 and 4 in which such levers abut against an edge of the burning-irons 72. In this position the edges 82 are spaced inwardly from the points of the teeth 74 an amount sufficient to permit the bottoms of said teeth to be inserted over the tops of separators 14 before pusher bars 80 engage lugs 16. The strength of springs 92 is sufficient to keep the pusher bars in such normal plate-tilting position when the only resistance thereto is the force required to tilt the plates 10 and 12 relative to separators 14.

As previously explained, it is desirable to tilt the plates angularly about 5° in order to raise the lugs 16 upwardly with respect to the tops of separators 14 a distance substantially equal to the thickness of teeth 74. When the plates have been so tilted by the joint forward movement of pusher bars 80 and burning-irons 72, it is necessary to thereafter stop the forward motion of the pusher bars and withdraw them as the burning-irons 72 are inserted with their teeth fully extended between the lugs 16. This is accomplished by rollers 94 or other abutment-like members mounted in brackets 96 on the supports 24. The rollers and brackets are in alinement with the slots in the supports 42 and 44 and will enter therein as those supports are moved inwardly of the receptacle. The rollers engage levers 84 intermediate their ends when the pusher bars 80 have advanced to the pre-described plate-tilted position. Thereafter continued inward motion of supports 42 and 44 will cause levers 84 to swing outwardly on shafts 88, thus withdrawing the upper ends outwardly from both the lugs and the burning-irons while such irons continue their inward movement to the lead-burning position shown in Figs. 5 and 6 and hereinbefore described. The outward movement of such pusher plates relative to the burning-irons stretches the spring 92 within the permissible limits thereof and without effect on the other parts of the apparatus. During the time that the pusher bars are being withdrawn and the burning-irons moved inwardly (which is a relatively short time) the plates 10 and 12 are maintained in their tilted position relative to the separators by the friction therebetween.

When the plates are tilted to the lead-burning position, and the teeth of the burning-iron completely inserted between lugs 16, the connecting straps may be mounted with their bodies 18 resting on the upper surface of teeth 74 and the fingers 20 thereof extending between the lugs 16 which then project above the chilling surfaces 76. As is well known in this art, burning-torches (not shown) may then be passed over fingers 20 and lugs 16 to apply intense flame and heat to the metal of the lugs and fingers, causing it to become moulten and to boil out of it any impurities. Because of the thickness of teeth 74 the heat applied may be more intense than that customarily used and thus a better weld and fusion obtained between the connecting straps and the lugs. It has also been found that it is possible to make the fingers 20 of the connecting straps short enough so that when the straps are positioned on the burning-irons the ends of the fingers will not reach the shoulder 78, thus exposing part of the chilling surface 76. The metal of the lugs for this part will be melted completely down to the chilling surface. In the liquid moulten state, the top level of the metal will be substantially horizontal, and because the chilling surface 76 slopes with respect to the horizontal, the weld between fingers 20 and lugs 16 will have a tapering section, thicker at the juncture of the fingers with body 18 than at the outer ends of the weld. This is not detrimental to the strength of the connection between the lug and connecting strap and in addition conserves a substantial amount of lead or other like metal used in the lugs and connecting straps.

After the connecting straps have been lead-burned the reciprocation of shaft 48 will cause the burning-irons 72 to be withdrawn from between the lugs 16 and from over the tops of separators 14. Automatically with such withdrawal of the burning-irons, the pusher plates 80 are restored to their initial position by the action of springs 92. The cell group may then be removed from the receptacle. As so removed the plates and separators are in the relative position shown in Fig. 2. It is only necessary for such group to be tapped on a flat surface to move the plates back to their normal relative position with respect to the separators as shown in Fig. 1. In this normal position the body 18 of connecting strap lies closely adjacent the tops of separator plates 14. Thus the overall height of the cell group is conserved, and in addition the separator plates are prevented, while in use, from working upwardly with respect to the plates, thereby exposing the lower edges of the plates to possible short-circuiting as deposits accumulate in the bottom of the battery.

Although only one embodiment of the invention is shown and described herein, it will be understood that this application is intended to cover such changes or modifications as come within the spirit of the invention or scope of the following claims.

I claim:

1. Apparatus for positioning prearranged separators and plates and inserting burning-irons preparatory to adding connecting straps for lead-burning to lugs on said plates comprising, a jig for supporting said separators and plates in the normal relationship for insertion in a battery cell with the lugs of said plates projecting above the tops of said separators, said jig having a fulcrum for engaging said plates adjacent the lower corner thereof as said plates are tilted, a slidably supported burning-iron having teeth adapted to intermesh with said plates when said iron is moved inwardly of said jig, said teeth being spaced closely above the tops of said separators as said irons are slid inwardly of said jig to hold said separators from tilting as said plates are tilted, a pusher bar movable in conjunction with said burning-iron and adapted to engage said lugs as said burning-iron is moved inwardly of said jig and to tilt said plates about said fulcrum to move said lugs upwardly of the tops of said separators an amount substantially equal to the thickness of said teeth whereby said teeth form the chilling bottom of a mould block preventing melted lead from running down and getting between said separators and preventing the heat of a lead-burning torch from adversely affecting the separators, and means for withdrawing said pusher bar after the tilting of said plates to clear the tops of said teeth and provide space thereon for mounting a connecting strap.

2. In apparatus of the class described, a receptacle for the plates and separators of a battery cell assembled in a normal group with the plate lugs of opposite polarity projecting upward from the upper edges of the separators in rows spaced inwardly from the side edges of the group, a series of teeth mounted in groups on opposite sides of said receptacle, means for supporting said groups, means for moving said groups inwardly from said opposite sides of said receptacle over the tops of said separators and in between said plates, plate-edge-engaging fulcrums constructed to engage the edges of said plates and positioned in said receptacle near the bottom thereof and on opposite sides thereof so that said plates are tilted thereabout, pusher members mounted on opposite sides of said receptacle, means for supporting said pusher members to engage the lugs of like polarity from opposite sides of said receptacle means for moving said pusher members inwardly of said said receptacle in synchronism with the movement of said groups of teeth to tilt said plates about said fulcrums relative to said separators, said series of teeth contacting the tops of said separators to keep said separators from tilting as said plates are tilted whereby said lugs are moved upwardly of the tops of said series of teeth to permit connecting straps with fingers intermeshing with the said lugs to be placed on the tops of said teeth so that said teeth and the body of said connector strap cooperate to form a mould block for the lead-burning of said connector straps and lugs.

3. Apparatus as claimed in claim 2 in which the means for supporting said groups consists of plate-like supporting members positioned on opposite sides of said receptacle, rods at the top of said receptacles extending thereacross from said opposite sides, bearings slidably mounting said rods, one of said supporting members being fixed to one end of said rods and another of said supporting members having bearings slidably mounting said member on said rods, there being motion transmission means for oppositely simultaneously moving said rods and said another supporting member to move said teeth inwardly and outwardly of said receptacle.

4. Apparatus as claimed in claim 2 in which the means for supporting said pusher members consists of pivoted levers mounted on said means for supporting said groups, spring connecting said levers and said means to move said pusher members inwardly of said receptacle, and abutment means on said receptacle for engaging said levers to cause said pusher members to be withdrawn relatively to said series of teeth and said receptacle when said series of teeth advance inwardly beyond a predetermined place.

5. Apparatus for positioning a cell-group of separators and plates with lugs preparatory to lead-burning connecting straps comprising a receptacle for said cell group, fulcrum means at the lower sides of the receptacle, comb structure supported at opposite sides of said receptacle for transverse movement to insert the teeth of said comb between the lugs of said plates to separate said plates and prevent said separators from tilting, said comb structure having teeth the upper surface of which slopes downwardly toward the points thereof to form a chilling surface substantially parallel with the top edges of the tilted plates, pusher means supported at opposite sides of said receptacle for transverse movement above said combs to engage said lugs to tilt said plates, and common actuating means to produce transverse movement of said combs and said pusher means.

6. Apparatus for positioning a cell-group of separators and plates with lugs preparatory to lead-burning connecting straps comprising a receptacle for said cell group, fulcrum means at the lower sides of the receptacle, comb structure supported at opposite sides of said receptacle for transverse movement to insert the teeth of said comb between the lugs of said plates to separate said plates and prevent said separators from tilting, pusher means supported at opposite sides of said receptacle for transverse movement above said combs to engage said lugs to tilt said plates, said pusher means including a lug-engaging bar having a forward lug-engaging end and a rearward end pivoted to said pusher means so that said forward end may swing upwardly as said pusher means is moved inwardly, and common actuating means to produce transverse movement of said comb and said pusher means.

BERNARD A. WEIDEMAN.

REFERENCES CITED

The following references are of record in the file of this patent:

UNITED STATES PATENTS

| Number | Name | Date |
|---|---|---|
| 1,531,753 | Norris | Mar. 31, 1925 |
| 1,932,136 | Hole | Oct. 24, 1933 |
| 1,960,195 | Nyce | May 22, 1934 |
| 2,430,188 | Sargent | Nov. 4, 1947 |
| 2,516,546 | Brown | July 25, 1950 |